(12) United States Patent
Jin

(10) Patent No.: US 8,411,961 B1
(45) Date of Patent: *Apr. 2, 2013

(54) METHOD AND APPARATUS FOR IMAGE FEATURE MATCHING IN AUTOMATIC IMAGE STITCHING

(75) Inventor: Hailin Jin, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/286,033

(22) Filed: Oct. 31, 2011

Related U.S. Application Data

(63) Continuation of application No. 11/843,043, filed on Aug. 22, 2007, now Pat. No. 8,073,259.

(51) Int. Cl.
*G06K 9/46* (2006.01)

(52) U.S. Cl. ......... 382/190; 348/36; 382/218; 382/284

(58) Field of Classification Search ............... 348/36, 348/584; 382/190, 284, 209, 218, 274
See application file for complete search history.

(56) References Cited

U.S. PATENT DOCUMENTS

| | | | |
|---|---|---|---|
| 6,539,106 B1 | 3/2003 | Gallarda et al. | |
| 6,650,791 B1 | 11/2003 | Cullen | |
| 7,092,572 B2 | 8/2006 | Huang et al. | |
| 7,239,805 B2 * | 7/2007 | Uyttendaele et al. | 396/222 |
| 7,366,360 B2 * | 4/2008 | Takiguchi et al. | 382/284 |
| 7,375,745 B2 | 5/2008 | Rai et al. | |
| 7,400,782 B2 | 7/2008 | Zhou et al. | |
| 7,424,218 B2 | 9/2008 | Baudisch et al. | |
| 7,460,730 B2 * | 12/2008 | Pal et al. | 382/284 |
| 7,650,044 B2 | 1/2010 | Kreang-Arekul et al. | |
| 7,725,257 B2 | 5/2010 | Strelow et al. | |
| 7,747,067 B2 | 6/2010 | Popescu et al. | |
| 8,073,259 B1 * | 12/2011 | Jin | 382/190 |
| 8,115,801 B2 * | 2/2012 | Mei et al. | 348/36 |
| 2004/0080670 A1 * | 4/2004 | Cheatle | 348/441 |
| 2005/0238198 A1 | 10/2005 | Brown et al. | |
| 2006/0050957 A1 * | 3/2006 | Naccari et al. | 382/165 |
| 2009/0003702 A1 | 1/2009 | Ofek et al. | |
| 2010/0111441 A1 | 5/2010 | Xiong et al. | |
| 2010/0194851 A1 * | 8/2010 | Pasupaleti et al. | 348/36 |

OTHER PUBLICATIONS

M. Brown and D. G. Lowe. Recognizing Panoramas. In Proceedings of the 9th International Conference on Computer Vision (ICCV2003), pp. 1218-1225, Nice, France, Oct. 2003.
Brown, M. and D. Lowe (2006) Automatic Panoramic Image Stitching using Invariant Features.
"Fully Automatic 2D Stitching," http://www.cs.ubc.ca/~mbrown/panorama/panorama.html#recognizing, Last Modified May 3, 2005, 8 pages.
"Autostitch™ :: a new dimension in automatic image stitching," http://www.cs.ubc.ca/~mbrown/autostitch/autostitch.html, Last Modified Apr. 3, 2007, 4 pages.

* cited by examiner

*Primary Examiner* — Gregory M Desire
(74) *Attorney, Agent, or Firm* — Wolfe-SBMC

(57) ABSTRACT

Method and apparatus for image feature matching in automatic image stitching processes. Embodiments may provide a computer-implemented method for performing a portion of an automatic image stitching process where feature correspondences are established between pairs of images. In embodiments, a computer-implemented image feature matching component may use a combination of one or more of heuristic techniques, information obtained from the user, file information related to the component images, and/or information obtained from previous feature matching iterations to narrow the number of images that are in a subset of component images to be compared for any given component image, and thus to narrow the number of pairs of component images on which image feature comparisons are performed.

20 Claims, 7 Drawing Sheets

METHOD AND APPARATUS FOR IMAGE FEATURE MATCHING IN AUTOMATIC IMAGE STITCHING

This application is a continuation of U.S. application Ser. No. 11/843,043, filed Aug. 22, 2007 now U.S. Pat. No. 8,073,259, which is incorporated by reference herein in its entirety.

BACKGROUND

1. Field of the Invention

This invention relates to computer systems, specifically to computer-aided image processing, and more specifically to the merging of images to form a composite image.

2. Description of the Related Art

Image capture devices, such as cameras, may be used to capture an image of a section of a view or scene, such as a section of the front of a house. The section of the view or scene whose image is captured by a camera is known as the field of view of the camera. Adjusting a lens associated with a camera may increase the field of view. However, there is a limit beyond which the field of view of the camera cannot be increased without compromising the quality, or "resolution", of the captured image. Further, some scenes or views may be too large to capture as one image with a given camera at any setting. Thus, it is sometimes necessary to capture an image of a view that is larger than can be captured within the field of view of a camera. In these instances, multiple overlapping images of segments of the view or scene may be taken, and then these component images may be joined together, or merged, to form a composite image.

One type of composite image is known as a panoramic image. A panoramic image may have a rightmost and leftmost image that each overlap only one other image, or alternatively the images may complete 360°, where all images overlap at least two other images. In the simplest type of panoramic image, there is one row of images, with each image at most overlapping two other images. However, more complex composite images may be captured that have two or more rows of images; in these composite images, each image may potentially overlap more than two other images. For example, a motorized camera may be configured to scan a scene according to an M×N grid, capturing an image at each position in the grid. Other geometries of composite images may be captured.

Computer programs and algorithms exist for assembling a single composite image from multiple potentially overlapping component images. The general paradigm for automatic image stitching techniques is to first detect features in individual images; second, to establish feature correspondences between pairs of images; and third, to use the feature correspondences to infer the geometric relationship among the images. To establish accurate feature correspondences for all of the component images, feature matching is typically performed for all possible pairs of images in the set of component images. Therefore, the total number of pairs of image for which feature matching is performed may be quadratic in terms of the number of images. Thus, for a large number of component images, the second step (feature matching) may be very time-consuming.

SUMMARY

Various embodiments of a method and apparatus for image feature matching in automatic image stitching processes are described. Embodiments may provide a computer-implemented method for performing a portion of an automatic image stitching process where feature correspondences are established between pairs of images. In embodiments, a computer-implemented image feature matching component may use a combination of one or more of heuristic techniques, information obtained from the user, file information related to the component images, and/or information obtained from previous feature matching iterations to narrow the number of images that are in a subset of component images to be compared for any given component image, and thus to narrow the number of pairs of component images on which image feature comparisons are performed.

In one embodiment, user input may be specified and input to the feature matching process, for example as a markup language file. An exemplary markup language that may be used in one embodiment is XML. In one embodiment, user input may specify positive and/or negative connectivity relationships among the input set of component images to be processed by feature matching component. In other embodiments, user input may also be used to specify other geometric information or other information about a set of component images, and/or about how the component images of a composite image were captured. If there is user input specifying positive and/or negative relationships among the input set of component images to be processed by feature matching component, a feature matching component may first attempt to perform feature matching in accordance with the information indicated in the user input. User input may, for example, be used to determine target component images and component image subsets to be used in feature matching. User input, if provided, may be, but is not necessarily, complete. That is, user input may specify a complete set of connectivity relationships among the component images necessary to generate the feature correspondences and determine the geometric relationships to generate a composite image. If so, then, feature matching may be completed using the user input. The geometric relationships generated by the feature matching component may then be passed to an image stitching component, which generates the composite image(s).

In one embodiment, if user input is not present or is not complete, then feature matching may not be completed using the user input. The feature matching component may thus attempt to use heuristics to determine feature matching information that may, for example, be used to determine target component images and component image subsets to be used in feature matching. The heuristics may include, but are not limited to, image file information about component images and geometric relationships generated by a geometric relationship determination module. Image file information related to the component images that may be used as heuristics may include, but is not limited to, file names, image sequence numbers, timestamps, or in general any file information related to component image files. If the feature matching component determines that available heuristics provide information that may be used, for example, to select target component images and/or to determine component image subsets to which target component images are to be compared, then feature matching component may perform feature matching according to the available heuristics. In various embodiments, the feature matching component may attempt to use two or more different heuristics, or combinations of heuristics, to perform feature matching. If feature matching is completed using the available heuristics, then the geometric relationships generated by the feature matching component may then be passed to an image stitching component, which generates the composite image(s).

Thus, embodiments of the feature matching component may use a combination of heuristic techniques, information obtained from the user, file information related to the component images, and/or information obtained from previous feature matching iterations, such as geometric relationships, to narrow the number of component images that are in a subset of component images to be compared to any given component image.

In one embodiment, if the feature matching component determines that available heuristics do not provide information that may be used in the feature matching process, or if feature matching cannot be completed using the available heuristics, then the feature matching component may perform or complete feature matching for the set of input composite images. In one embodiment, the feature matching component may default to comparing every image, or every remaining unprocessed image, to every other component image in the set of component images. Alternatively, the feature matching component may use some other method or methods to determine target component images and component image subsets to be used in the feature matching process.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for image feature matching in automatic image stitching processes are described. Embodiments may provide a computer-implemented method for performing a portion of an automatic image stitching process where feature correspondences are established between pairs of images. In embodiments, a computer-implemented image feature matching component may use a combination of one or more of heuristic techniques, information obtained from the user, file information related to the component images, and/or information obtained from previous feature matching iterations to narrow the number of images that are in a subset of component images to be compared for any given component image, and thus to narrow the number of pairs of component images on which image feature comparisons are performed.

Figure 1:
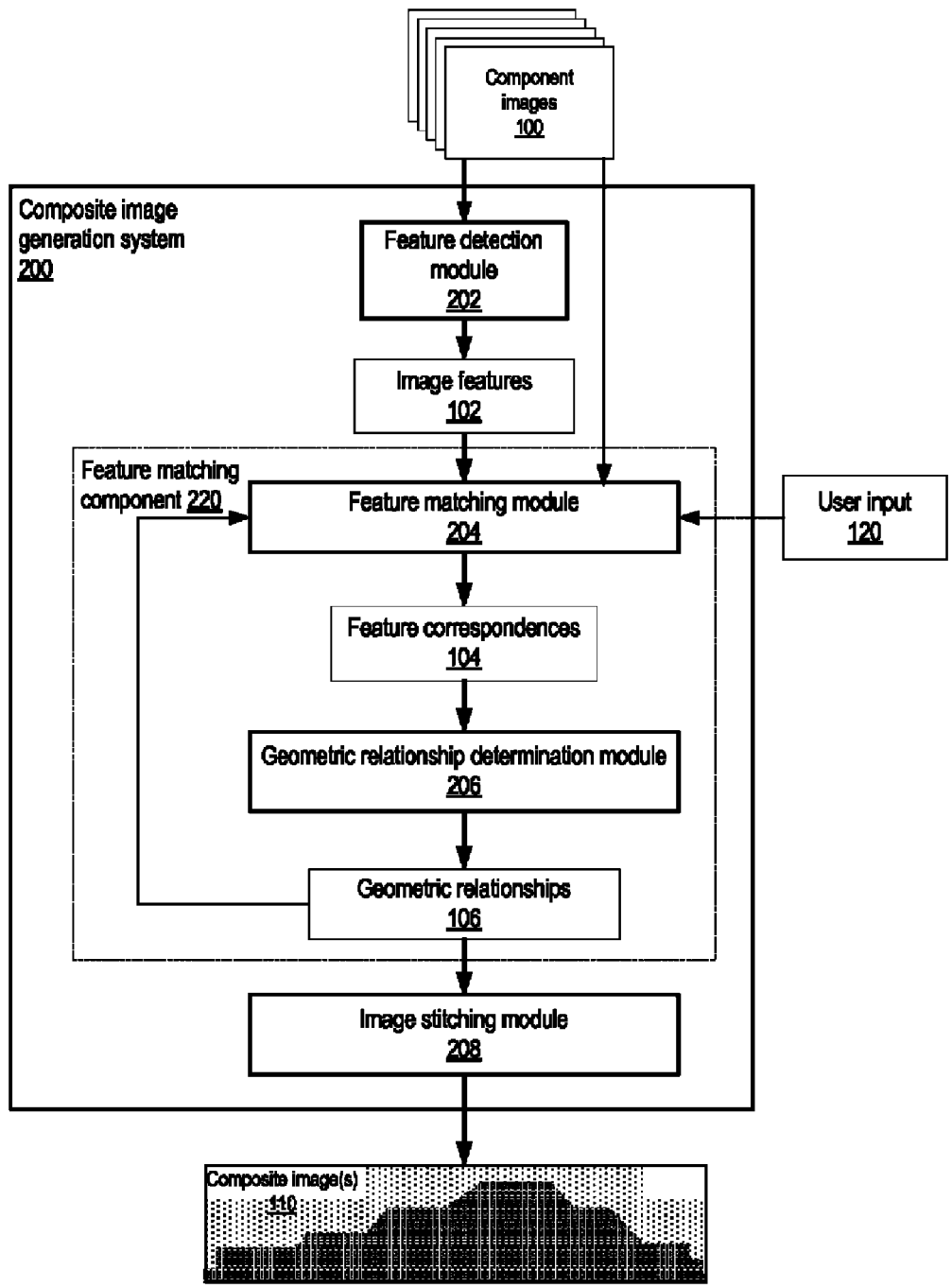
FIG. 1 illustrates an exemplary composite image generation system that includes an exemplary image feature matching component according to one embodiment.
Figure 7:
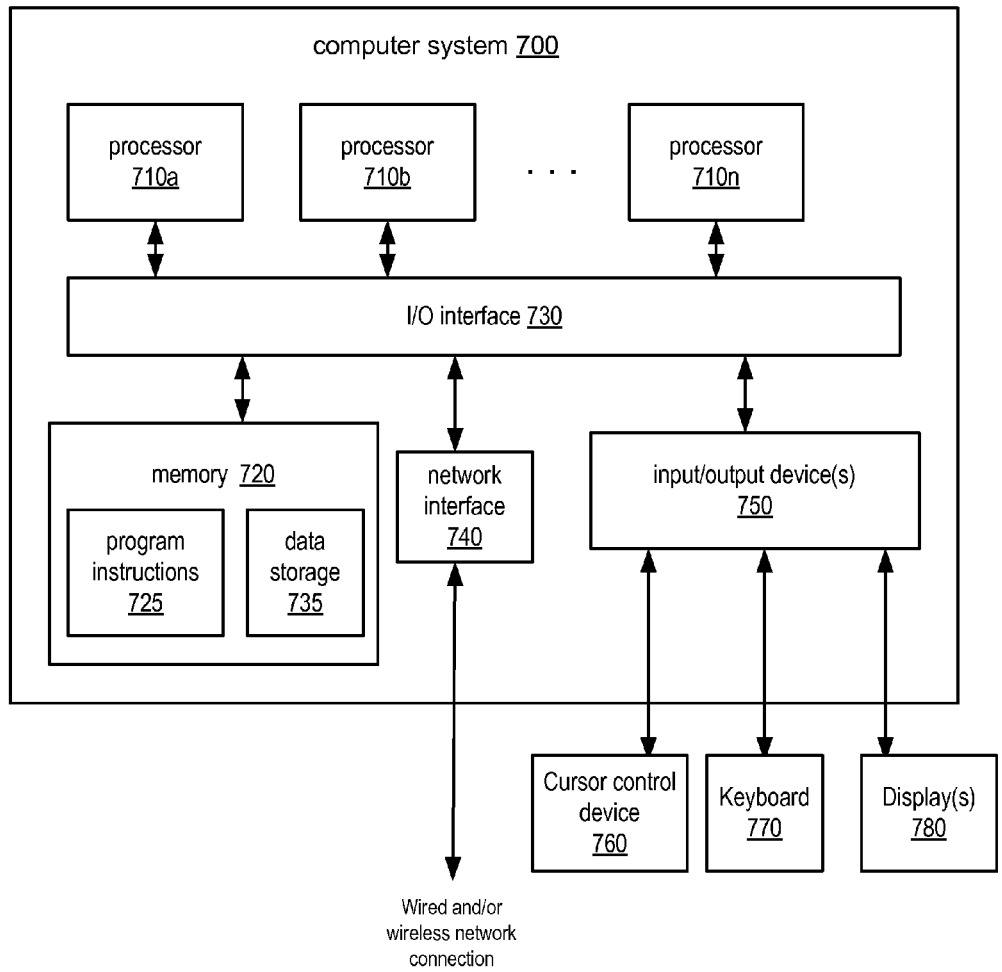
FIG. 7 illustrates an exemplary computer system that may be used in embodiments.

FIG. 1 illustrates an exemplary composite image generation system that includes an exemplary image feature matching component according to one embodiment. Composite image generation system 200 may be a computer program, application, system or component which may execute on a computer system or combination of two or more computer systems. An exemplary computer system on which composite image generation system 200 may be implemented is illustrated in FIG. 7. A set of two or more component images 100 may be input into the composite image generation system 200. Feature detection 202 may be performed on all of the component images by a feature detection module 202 to generate a set of image features 102. An example of an image feature that may be detected is an edge detected using an edge detection algorithm. Other types of image features may also be detected by feature detection module 202. Embodiments of the feature matching component 220 do not depend on the types of image features detected by feature detection module 202.

Once the image features 102 are detected, the feature matching component 220 determines the feature correspondences 104 and geometric relationships 106 among the component images 100. In one embodiment, feature matching component 220 may include a feature matching module 204 and a geometric relationship determination module 206. Feature matching module 204 receives component images 100, image features 102, and possibly user input 120 and compares selected ones of the component images to one or more determined subsets of the composite images to determine feature correspondences 104 in accordance with the received input. Geometric relationship determination module 206 determines geometric relationships 106 among the component images 100 from the determined feature correspondences 104. Geometric relationships 106 may include information indicating geometric relationships among images including one or more of, but not limited to, information indicating overlapping images, information indicating non-overlapping images, and information describing a region of overlap between two images if the images do overlap. Geometric relationships 106 may also indicate or be used to determine positional information about component images, for example whether a first image is to the left of, right of, above, or below a second image. Geometric relationships 106 may be used to generate a geometry for a portion of or the entire composite image 110, and relative positional and positive and negative connectivity information within the geometry of two or more images.

Feature matching component 220 may use a combination of heuristic techniques, information obtained from the user (user input 120), file information related to the component images 100, and/or information obtained from previous feature matching iterations, such as geometric relationships 106, to narrow the number of component images 100 that are in a subset of component images 100 to be compared to any given component image 100. In one embodiment, previously determined geometric relationships 106 may be used by feature matching component 220 when determining subsets of component images 100 and/or when comparing two component images 100.

User input 120 may be used, for example, to specify connectivity relationships among the component images 100. For example, user input 120 may specify two or more component images 100 that are indicated by a user as connected or overlapping (positive connectivity relationships), and may also specify two or more component images 100 that are indicated by the user as not connected or not overlapping (negative connectivity relationships). Embodiments of the feature matching component 220 may use user input 120, if provided, to determine pairs or subsets of component images to be compared. User input 120, if provided, may be, but is not necessarily, complete. That is, user input 120 may specify a complete set of connectivity relationships among the component images necessary to determine the geometric relationships 106 to generate a composite image 110. If so, then no further determination (e.g., using heuristics) of connectivity subsets of composite images 100 may need to be performed by feature matching component 220. Instead, if the user inputs a complete set of connectivity relationships, feature matching may proceed based on the user-supplied connectivity relationships. If user input 120 is not complete, then the connectivity relationships among the component images 100 indicated by user input 120 may be processed first by feature matching component 220, after which the feature matching component 220 may continue, using heuristics or other mechanisms, selecting target component images, determining subsets of composite images 100 for comparison to the target component images, and generating geometric relationships 106 in accordance with feature correspondences 104 generated from the comparison of the target component images to the determined subsets of composite images.

In one embodiment, user input 120 may be specified and input to the feature matching process, for example as a markup language file. An exemplary markup language that may be used in one embodiment is XML. Other markup languages, other formats than markup languages, or other user input mechanisms may be used in various embodiments. An exemplary XML file that specifies the complete connectivity relationships among four component images 100, component images 100A, 100B, 100C, and 100D, is illustrated below. This example specifies that there is positive connectivity between images 100A and 100B, 100B and 100C, 100C and 100D, and 100D and 100A, and negative connectivity between images 100A and 100C, 100B and 100D. Note that this is exemplary, and is not intended to be limiting. Further note that the input may include other XML content not shown:

<connectivity>
  <on>//COMMENT: <on>/</on> specifies positive connectivity
    <link start="100A" end="100B"></link>
    <link start="100B" end="100C"></link>
    <link start="100C" end="100D"></link>
    <link start="100D" end="100A"></link>
  </on>
  <off>//COMMENT: <off>/</off> specifies negative connectivity
    <link start="100A"end="100C"></link>
    <link start="100B" end="100D"></link>
  </off>
</connectivity>

As noted above, user input 120 may be used, for example, to specify positive and/or negative connectivity relationships among the component images 100. User input 120 may also be used to specify other geometric information or other information about a set of component images 100, and/or about how the component images 100 of a composite image were captured. For example, user input 120 may be used to specify row and column or other geometric information about a composite image. As an example, user input 120 may be used to specify that a composite image is a panoramic image that consists of N composite images, and to specify that one of the composite images is a first (leftmost or rightmost, top or bottom) image in the panoramic image. As another example, user input 120 may be used to specify that the composite image is a panoramic image that consists of N composite images, but that the panorama completes 360°, and thus there is no leftmost or rightmost, top or bottom image in the panoramic image. As another example, user input 120 may be used to specify that the composite image is composed of a grid of M rows and N columns of composite images. As another example, user input 120 may be used to specify the amount of overlap or connectivity between some or all of the composite images 100. As an example of this, user input 120 may be used to specify that the composite image is composed of a grid of M rows and N columns of composite images, and that the images in a row overlap adjacent images on each side by 10%, and images in a column overlap adjacent images above and below by 5%. Note that user input 120 may be used to specify other geometries than the panoramic composite images and M×N grid composite images described above.

File information related to the component images 100 may include, but is not limited to, file names, image sequence numbers, timestamps, or in general any file information that may be used in determining relationships among component image files 100.

Once feature matching component 220 has processed all of the component images 100, the determined geometric relationships 106 may be passed to image stitching module 208, which may then generate the composite image 110 from the component images 100 using the information in geometric relationships 106. It is possible that feature matching component 220 may determine that component images 100 actually compose two or more composite images 110, and therefore image stitching module 208 may, in some cases, generate two or more corresponding composite images 110 in accordance with the geometric relationships 106 output by feature matching component 220.

Figure 2:
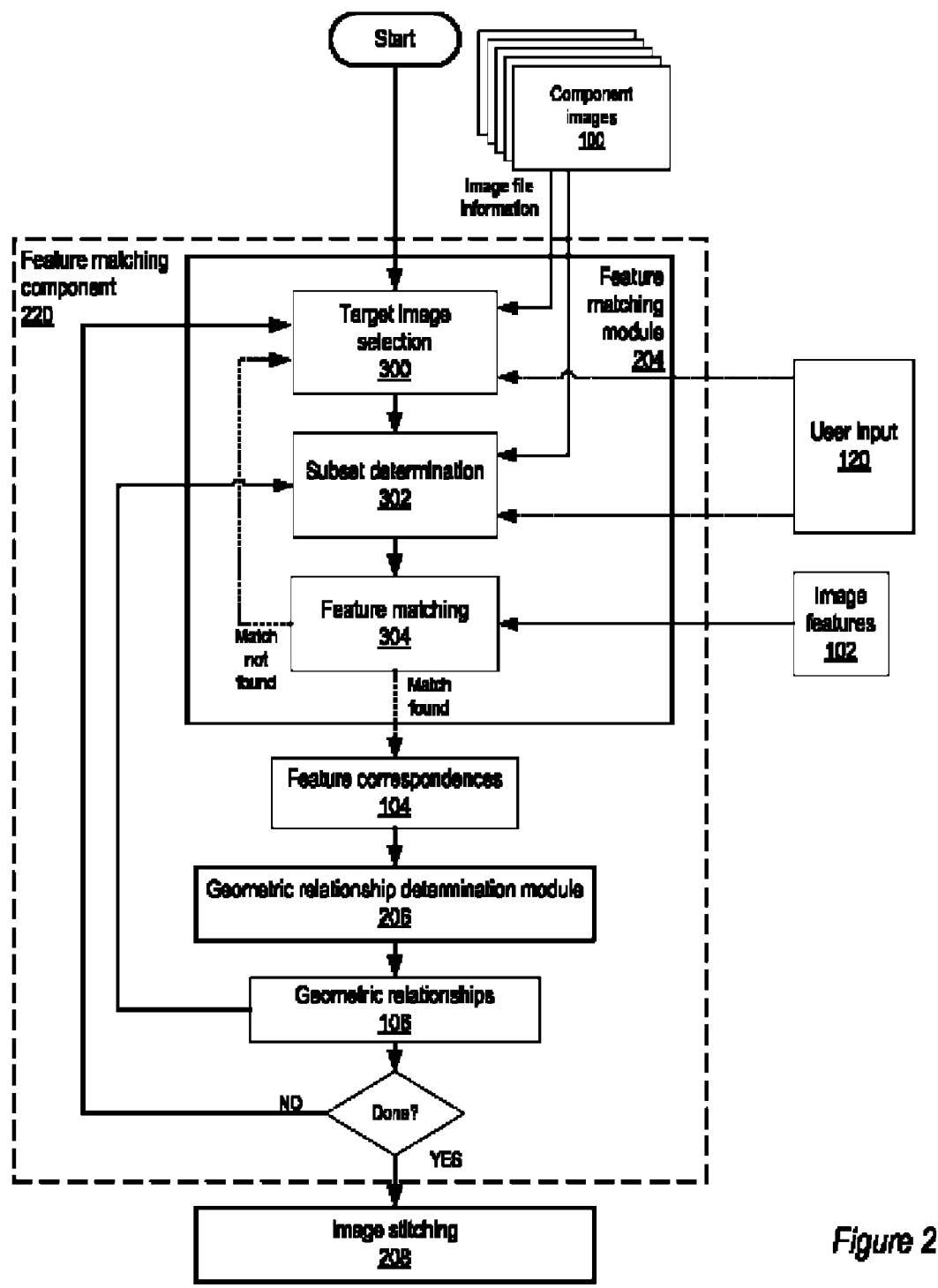
FIG. 2 illustrates an exemplary image feature matching component of an exemplary composite image generation system in more detail, according to one embodiment.

FIG. 2 illustrates an exemplary image feature matching component of an exemplary composite image generation system in more detail, according to one embodiment. A set of two or more component images 100 may be input into the composite image generation system 200. Feature detection 202 may be performed on all of the component images by a feature detection module 202 to generate a set of image features 102. Once the image features 102 are detected, the feature matching component 220 is invoked to determine the feature correspondences 104 and geometric relationships 106 among the component images 100.

Figure 3:
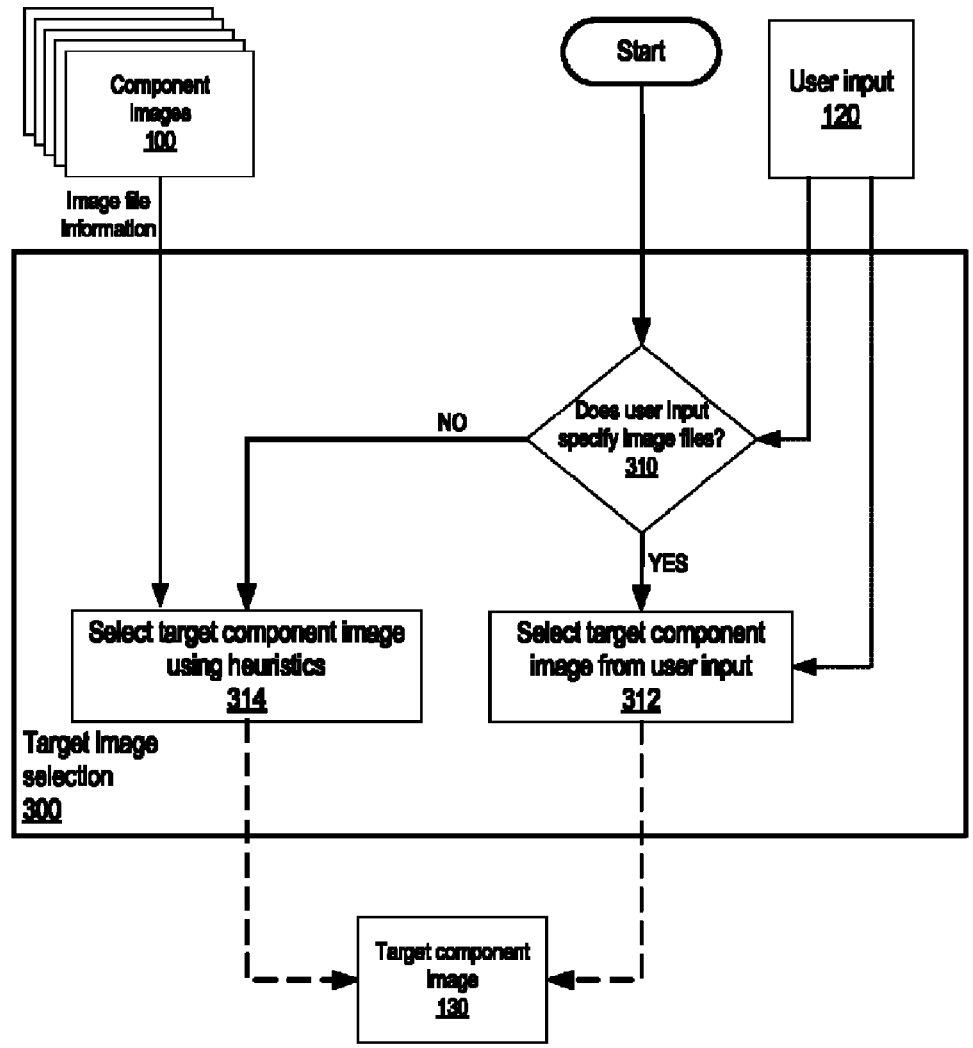
FIG. 3 illustrates an exemplary process or submodule of an exemplary image feature matching component that selects a target component image, according to one embodiment.
Figure 4:
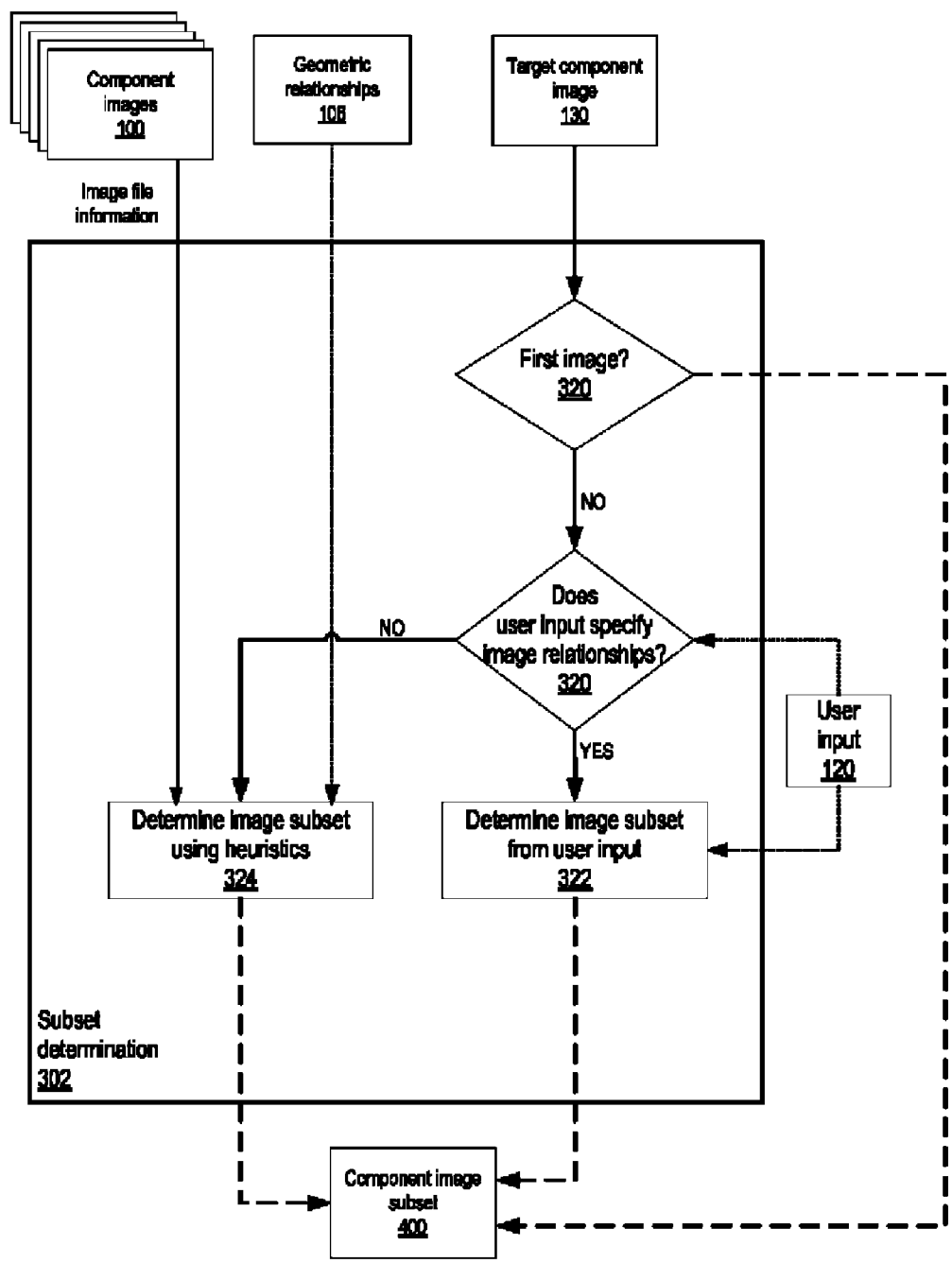
FIG. 4 illustrates an exemplary process or submodule of an exemplary image feature matching component that determines subsets of component images for comparison to target component images, according to one embodiment.
Figure 5:
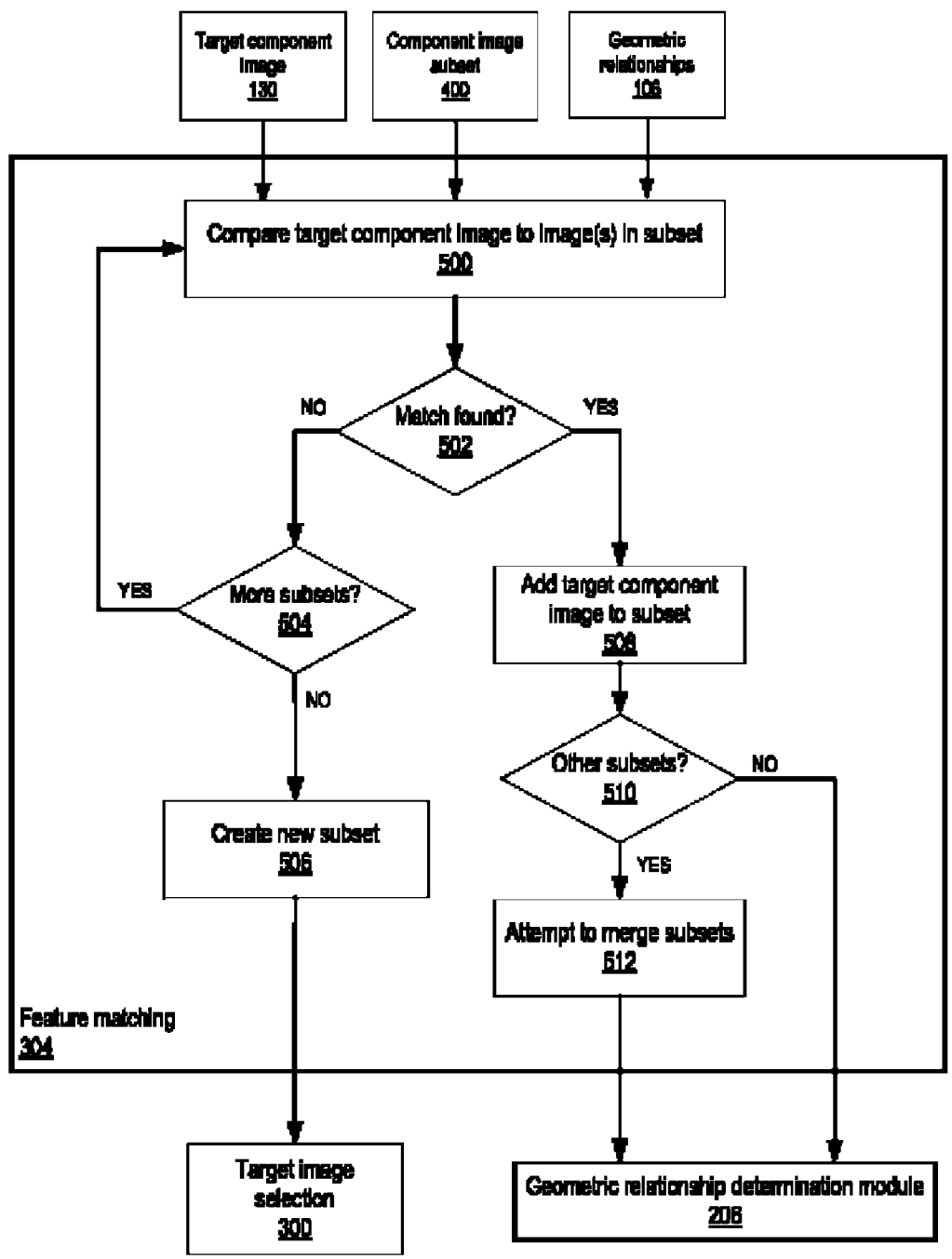
FIG. 5 illustrates an exemplary process or submodule of an exemplary image feature matching component that performs feature matching of a target image to image(s) in subset(s), according to one embodiment.

In one embodiment, feature matching component 220 may include a feature matching module 204 and a geometric relationship determination module 206. Feature matching module 204 receives or has access to component images 100, image features 102, and possibly user input 120, and compares selected ones of the component images to one or more determined subsets of the composite images to determine feature correspondences 104 in accordance with the component images 100, image features 102, and possibly user input 120. Feature matching component 220 may use a combination of heuristic techniques, information obtained from the user (user input 120), file information related to the component images 100, and/or information obtained from previous feature matching iterations, such as geometric relationships 106, to narrow the number of component images 100 that are in a subset of component images 100 to be compared to any given component image 100. In one embodiment, previously determined geometric relationships 106 may be used by feature matching component 220 when determining subsets of component images 100 and/or when comparing two component images 100. In one embodiment, feature matching module 204 may include a process or submodule that selects target component images (target image selection 300), a process or submodule that determines subsets of component images to which the target component images are to be compared (subset determination 302), and a process or submodule that performs feature matching of the target component images to the component images in the determined subsets (feature matching 304). FIGS. 3, 4, and 5 illustrate exemplary embodiments of each of these processes or submodules of feature matching component 220.

FIG. 3 illustrates an exemplary process or submodule of an exemplary image feature matching component that selects a target component image, according to one embodiment. Once the image features 102 are detected by featured detection module 202, feature matching component 220 is invoked to determine the feature correspondences 104 and geometric relationships 106 among the component images 100. Feature matching module 204 receives or has access to component images 100, image features 102, and possibly user input 120. A process or submodule (target image selection 300) of feature matching component 220 selects target component images. When feature matching component 220 is first invoked for component images 100, a first target component image is selected. During the feature matching process performed by feature matching component 220, additional target component images may be selected by target image selection 300 until feature matching is completed. In one embodiment, target image selection 300 selects only one target component image at each iteration of the feature matching process.

In one embodiment, user input 120 may be specified and input to the feature matching process, for example as a markup language file. An exemplary markup language that may be used in one embodiment is XML. Other markup languages, other formats than markup languages, or other user input mechanisms may be used in various embodiments. An exemplary XML user input 120 is described above in reference to FIG. 1. User input 120 may specify positive and/or negative connectivity relationships among the component images 100. For example, user input 120 may specify two or more component images 100 that are indicated by the user as connected or overlapping (positive connectivity relationships), and may also specify two or more component images 100 that are indicated by the user as not connected or not overlapping (negative connectivity relationships). In one embodiment, as indicated at 310, target image selection 300 may check to see if there is user input 120 that specifies component images 100 and, if so, may select a target component image from user input 120, as indicated at 312. In one embodiment, when feature matching component 220 is first invoked for component images 100, a first target component image may be selected from the component images indicated by user input 120. In one embodiment, a first component image indicated in user input 120 may be selected as the first target component image. In one embodiment, a first component image indicated by a positive connectivity relationship in user input 120 may be selected as the first target component image. During the feature matching process performed by feature matching component 220, additional target component images may be selected by target image selection 300 until feature matching is completed. Thus, target image selection 300 may access user input 120 in a similar way to determine subsequent target component images.

In one embodiment, user input 120 specifying positive and negative connectivity relationships may not be provided. In one embodiment, user input 120 may be optional. In addition, in one embodiment, user input 120, if provided, may not necessarily be complete. That is, user input 120 may not specify a complete set of connectivity relationships among the component images 100 necessary to determine the geometric relationships 106 to generate a composite image 110. Thus, at 310, if user input 120 is not provided or cannot be used to select a next target component image, target image selection 300 may attempt to use heuristics to select a next target component image.

In one embodiment, when feature matching component 220 is first invoked for component images 100, a first target component image may be selected from the component images indicated by user input 120. If user input 120 is not provided or cannot be used to select a first component image, target image selection 300 may attempt to use heuristics to select a first target component image. The heuristics used to select a first target component image may include, but are not limited to, image file information about component images 100. Image file information related to the component images 100 that may be used to select a first target component image may include, but is not limited to, file names, image sequence numbers, timestamps, or in general any file information related to component image files 100. As one example, in one embodiment, target image selection 300 may select a middle image from component images 100 using the file names and/or image sequence numbers. For example, if the image files are named imageFile1, imageFile2, imageFile3, imageFile4 and imageFile5, target image selection 300 may examine the file names and select imageFile3 as the first target component image, as imageFile3 is indicated by the file names as likely to be the middle file in the component images 100. Alternatively, the first, last, or even some other component file may be selected as the first target component image according to the image file names.

Similarly, image sequence numbers, image timestamps, or other image or image file information may be used to select the middle, first, last, or even some other component file as the first target component image. In some embodiments, a combination of two or more elements from image file information may be used to select a first target component image. In some embodiments, target image selection 300 may first attempt to use one element, such as the file name, to select a first target component image, and if that element does not indicate a first target component image, target image selection 300 may attempt to use a different element, such as image sequence numbers or timestamps, to select a first target component image. In some embodiments, one or more additional elements may be tried to see if a first target component image may be heuristically determined. In one embodiment, if target image selection 300 cannot determine a first target component image from the image file information, target image selection 300 may default to randomly or otherwise select a first target component image.

During the feature matching process performed by feature matching component 220, additional target component images may be selected by target image selection 300 until feature matching is completed. If user input 120 is not provided or cannot be used to select a next component image, target image selection 300 may attempt to use heuristics to select a next target component image. The heuristics used to select a next target component image may include, but are not limited to, image file information about component images 100, in a process similar to that described above in regard to selecting a first target component image. For example, if the first target component image was the middle image in component images 100 as determined from the image file information (e.g. file name, image sequence number, timestamp, etc), a next target component image that is just before (previous) or just after (next) the first target component image may be selected using one or more elements of the image file information. As another example, if the first target component image was the first or last image in component images 100 as determined from the image file information, a next or previous component image (respectively) may be selected using one or more elements of the image file information. Note that other algorithms than selecting a next or previous image may be implemented by target image selection 300.

As shown in FIG. 1, geometric relationships 106 generated by geometric relationship determination module 206 may be fed back into feature matching module 204. In some embodiments, geometric relationships 106 determined by geometric relationship determination module 206 from feature correspondences 104 output by feature matching module 204 may be used by target image selection 300 as illustrated in FIG. 3 in determining a next target component image instead of or in addition to heuristics from image file information. For example, target image selection 300 may use geometric relationships 106 to select a next target component image that does, or is likely to, overlap the previous target component image, or alternatively to select a next target component image that does not, or is not likely to, overlap the previous target component image, depending on the algorithm used to determine a next target component image.

In one embodiment, if target image selection 300 cannot determine a next target component image using image file information and/or geometric relationships heuristics as indicated above, target image selection 300 may default to randomly or otherwise select a next target component image.

The output of target image selection 300 is target component image 130. Target component image 130 may be a first target component image or a subsequent (next) target component image.

FIG. 4 illustrates an exemplary process or submodule of an exemplary image feature matching component that determines subsets of component images for comparison to target component images, according to one embodiment. Feature matching module 204 receives or has access to component images 100, image features 102, and possibly user input 120. A process or submodule (subset determination 302) of feature matching component 220 determines a subset of component images for comparison to a target component image 130 selected by target image selection 300. When feature matching component 220 is first invoked for component images 100, a first target component image is selected by target image selection 300 and passed to subset determination 302.

In one embodiment, at 320, if target component image 130 is the first target component image, target component image 130 may be placed in a component image subset 400 that includes, at this time, only the first target component image. Control may then be passed back to target image selection 300 to select another component image as the current target component image, which will then be passed to subset determination 302. Since at this time there is only one component image subset 400, component image subset 400 and the next (or current) target component image 130 may be passed to feature matching 304 for comparison to the component images in component image subset 400 (which, at this time, includes only the first target component image).

As an alternative to the above, in one embodiment, if target component image 130 is the first target component image, instead of placing the first target component image into a component image subset 400 and passing control back to target image selection 300, subset determination 302 may determine a component image subset 400 including one or more component images to which the first target component image is to be compared by feature matching 304.

If the images match, the current target component image 130 may be added to component image subset 400. Generated feature correspondences 104 may then be passed to geometric relationship determination module 206, which generates geometric relationships 106 from feature correspondences 104. Control may then be passed back to target image selection 300 to select another component image from component images 100 as the current target component image 130, which is then passed to subset determination 302, which selects a component image subset 400 from among the one or more subsets to which the current target component image 130 is to be compared in feature matching 304, possibly using the generated geometric relationships 106.

If the images do not match, a new component image subset may be generated that includes the current target component image. Control may then be passed back to target image selection 300 to select another component image from component images 100 as the current target component image 130, which is then passed to subset determination 302, which selects a component image subset 400 from among the one or more subsets to which the current target component image 130 is to be compared in feature matching 304.

If at least one match is found for current target component image 130 in component image subset 400 by feature matching 304, the current target component image 130 may be added to the component image subset 400. Otherwise, if there are other subsets 400, the current target component image 130 may be compared to at least one of the subsets, and added to a subset if a match is found in the subset. In one embodiment, if the current target component image 130 is added to one of two or more subsets 400, the subset 400 to which the current target component image 130 was added may be compared to one or more other subsets 400 to determine if the subsets can be merged.

If a match is found in a subset 400 for the current target component image 130, generated feature correspondences 104 may be passed to geometric relationship determination module 206, which generates geometric relationships 106 from feature correspondences 104. Control may then be passed back to target image selection 300 to select another component image from component images 100 as the current target component image 130, which is then passed to subset determination 302, which selects a component image subset 400 from among the one or more subsets to which the current target component image 130 is to be compared in feature matching 304.

If no match is found for current target component image 130, a new subset including the current target component image 130 may be created. Control may then be passed back to target image selection 300 to select another component image from component images 100 as the current target component image 130, which is then passed to subset determination 302, which selects a component image subset 400 from among the one or more subsets to which the current target component image 130 is to be compared in feature matching 304.

The feature matching process described above may continue iterating as described above until all component images have been processed. Operations of feature matching 304 are further described below in reference to FIG. 5.

In one embodiment, user input 120 may be specified and input to the feature matching process, for example as a markup language file. An exemplary markup language that may be used in one embodiment is XML. Other markup languages, other formats than markup languages, or other user input mechanisms may be used in various embodiments. An exemplary XML user input 120 is described above in reference to FIG. 1. User input 120 may specify connectivity relationships among the component images 100. For example, user input 120 may specify two or more component images 100 that are indicated by the user as connected or overlapping (positive connectivity relationships), and may also specify two or more component images 100 that are indicated by the user as not connected or not overlapping (negative connectivity relationships). In one embodiment, as indicated at 320, subset determination 302 may check to see if there is user input 120 that specifies component images 100 and, if so, may use the user input 120 to determine a component image subset 400 to which the first target component image is to be compared, as indicated at 322.

As an example, the exemplary XML file described above in reference to FIG. 1 specifies the connectivity relationships among four component images 100, component images 100A, 100B, 100C, and 100D. The example specifies that there is positive connectivity between images 100A and 100B, 100B and 100C, 100C and 100D, and 100D and 100A, and negative connectivity between images 100A and 100C, 100B and 100D. Thus, if image 100A is the first target component image, subset determination 302 may use the indicated connectivity relationships to select either image 100B or image 100D, or both images 100B and 100D, for inclusion in component image subset 400, because both of those images are indicated as having positive connectivity to image 100A. Likewise, subset determination 302 would know not to include image 100C in component image subset 400 for comparison to image 100A because negative connectivity is indicated for those two images.

User input 120, if available, may be similarly used by subset determination 302 to determine component image subsets 400 for comparison to subsequent target component images.

In one embodiment, user input 120 specifying positive and negative connectivity relationships may not be provided. In one embodiment, user input 120 may be optional. In addition, in one embodiment, user input 120, if provided, may not necessarily be complete. That is, user input 120 may not specify a complete set of connectivity relationships among the component images 100 necessary to determine all component image subsets 400. Thus, at 320, if user input 120 is not provided or cannot be used to determine a component image subset 400, subset determination 302 may use heuristics to select a component image subset 400 including one or more other component images for comparison to the current target component image 130 (whether the first target component image or a subsequent target component image), as indicated at 324. In one embodiment, subset determination 302 may use a combination of user input and heuristics (e.g., image file information and/or geometric relationships 106) to select a component image subset 400.

The heuristics used to select a component image subset 400 may include, but are not limited to, image file information about component images 100. For example, if the current target component image is the middle image in component images 100 as determined from the image file information (e.g. file name, image sequence number, timestamp, etc), a component image that is just before and/or a component image that is just after the current first target component image as indicated by one or more elements of the image file information may be included in component image subset 400 by subset determination 302. As another example, if the current target component image is the first image in component images 100 as determined from the image file information, a component image that is just after the current first target component image as indicated by one or more elements of the image file information may be included in component image subset 400 by subset determination 302. As yet another example, if the current target component image is the last image in component images 100 as determined from the image file information, a component image that is just before the current first target component image as indicated by one or more elements of the image file information may be included in component image subset 400 by subset determination 302.

As shown in FIG. 1, geometric relationships 106 generated by geometric relationship determination module 206 may be fed back into feature matching module 204. In some embodiments, geometric relationships 106 determined by geometric relationship determination module 206 from feature correspondences 104 output by feature matching module 204 may be used by subset determination 302 as illustrated in FIG. 4 in determining component image subset 400 instead of or in addition to heuristics from image file information. For example, subset determination 302 may use geometric relationships 106 to select one or more component images for inclusion in component image subset 400 that do, or are likely to, overlap the current target component image as indicated by geometric relationships 106, and/or to exclude one or more component images from component image subset 400 that do not, or are not likely to, overlap the current target component image as indicated by geometric relationships 106. Note that if the target component image 130 is the first target component image, geometric relationships 106 have not yet been generated, and therefore the subset determination 302 may not use geometric relationships 106 to determine a first component image subset 400 for comparison to a first target component image 130 in the feature matching process.

As a simple example of using heuristics including but not limited to geometric relationships 106 to determine one or more component images for inclusion in component image subset 400 for comparison to a current target component image, suppose an image image1 is the current target component image 130. For this example, the component images 100 of which image1 is a member are known to be components of a panoramic image having a generally one-dimensional linear sequence of images. Other images in component images 100 may be image1, image3, image4, image5, and image6. For this example related to using geometric relationships 106 as heuristics in determining a component image subset 400, the numbering of the images is irrelevant. Subset determination 302 may determine, from geometric relationships 106, that the right side of image3 overlaps the left side of image4, and that the right side of image4 overlaps the left side of image5. From this information alone, subset determination 302 may determine that image1 does not or is not likely to overlap image4 (since both neighbors of image4 have already been determined in the linear panoramic image sequence), and thus may exclude image4 from a component image subset 400 to which image1 is to be compared. Thus, subset determination 302 may include image2, image3, image5, and image6 in component image subset 400 to which image1 is to be compared. Alternatively, suppose that image3, image4, and image5 have been processed (as indicated by the fact that, in this example, geometric relationships 106 includes information related to these three images), but image2 and image6 have not yet been processed, by composite image generation system 200. In this case, only image3 and image5 may be included in component image subset 400 by subset determination 302. In other words, if information is already known about the collective relationship of the images (such as the images all being part of a generally one-dimensional linear panoramic image sequence), then as geometric relationships are determined for some of the images, this information can be used heuristically to narrow down the potential images for comparison to a target image.

In one embodiment, subset determination 302 may use a combination of geometric relationships 106 and user input and/or image file information in determining component image subset 400. As a simple example, suppose an image image4 is the current target component image 130. For this example, the component images 100 of which image1 is a member are known to be components of a panoramic image. Other images in component images 100 may be image1, image2, image3, image5, and image6. In this example, image1 is known from user input or from image file information to be the first (leftmost or rightmost, top or bottom) image of a panoramic image. Subset determination 302 may determine, from geometric relationships 106, that image1 overlaps image2, and that image2 overlaps image3. From this information alone, subset determination 302 may determine that image4 does not or is not likely to overlap image1 and image2, and thus may exclude image1 and image2 from a component image subset 400 to which image4 is to be compared.

The output of subset determination 302 is component image subset 400, which includes a subset of set of component images 100 to which the current target component image 130 is to be compared in feature matching 304. Component image subset 400 may include one or more of the component images from the set of component images 100 that the composite image generation system 200 is currently processing. Embodiments of the feature matching component 220 described herein, via subset determination 302 as described herein, may tend to narrow the total number of component images from the set of component images 100 to which the target image is compared. This reduction is accomplished via the application of user input and/or heuristics in the subset determination 302 process or submodule, as described herein, to include component images in component image subset 400 which do or are likely to have connectivity with target component image 130, and/or to exclude component images from component image subset 400 which do not or are not likely to have connectivity with target component image 130.

In one embodiment, if subset determination 302 cannot determine a component image subset 400 using user input 120, image file information and/or geometric relationships heuristics as indicated above, subset determination 302 may default to randomly or otherwise select one or more component images for inclusion in component image subset 400. For some input sets of component images 100, it may be the case that subset determination 302, for at least some target component images, may not be able to narrow the number of images in component image subset 400 to which the target component image is to be compared, and thus component image subset 400 may include all of the other images in the input set of component images 100.

FIG. 5 illustrates an exemplary process or submodule of an exemplary image feature matching component that performs feature matching of a target image to image(s) in subset(s), according to one embodiment. Feature matching module 204 receives or has access to component images 100, image features 102, and possibly user input 120. Subset determination 302 determines a subset of component images (component image subset 400) for comparison to a target component image 130 selected by target image selection 300, as described above. A process or submodule (feature matching 304) of feature matching component 220 receives the target component image 130 and the component image subset 400 and attempts to feature match the target component image 130 to the image(s) in the subset 400, as indicated at 500. An example of an image feature is an edge detected using an edge detection algorithm. Other types of image features may also be detected by feature detection module 202 and used in feature matching 304. Embodiments of feature matching 304 do not depend on the types of image features detected by feature detection module 202.

As indicated at 502, if at least one image in component image subset 400 is found that matches (e.g., overlaps) target component image 130, target component image 130 may be added to the component image subset 400 as indicated at 508. In one embodiment, as indicated at 510, if there are one or more other subsets 400, feature matching 304 may attempt to merge the subsets as indicated at 512. In one embodiment, if one or more images in component image subset 400 may be compared to one or more images in one or more of the other subsets 400 to determine if the subsets include overlapping images. If a subset 400 is found that includes at least one overlapping image with at least one image in component image subset 400, the two subsets may be merged. In one embodiment, if there are more subsets, feature matching 304 may attempt to merge the merged subset 400 with the other subsets.

If, at 510, there are no other subsets 400, or alternatively if there are other subsets and the merging of subsets as indicated at 512 has been completed, control may be passed to geometric relationship determination module 206, which receives the feature correspondences 104 generated by feature matching module 204 and, from the feature correspondences 104, generates geometric relationships 106. Note that the any newly generated geometric relationships 106 may be compiled into a set of previously generated geometric relationships 106. In one embodiment, geometric relationships 106 may be fed back into feature matching module 204 for use as heuristics in the next iteration.

In one embodiment, if no match is found at 502, and if there are more subsets 400, feature matching 304 may return to 500 and compare the current target component image 130 to image(s) in another one of the subsets. In one embodiment, if no match is found at 502, and if there are no more subsets 400, a new subset 400 including the current target component image 130 may be created as indicated at 506. Control may then be passed back to target image selection 300 to begin another iteration.

Figure 6:
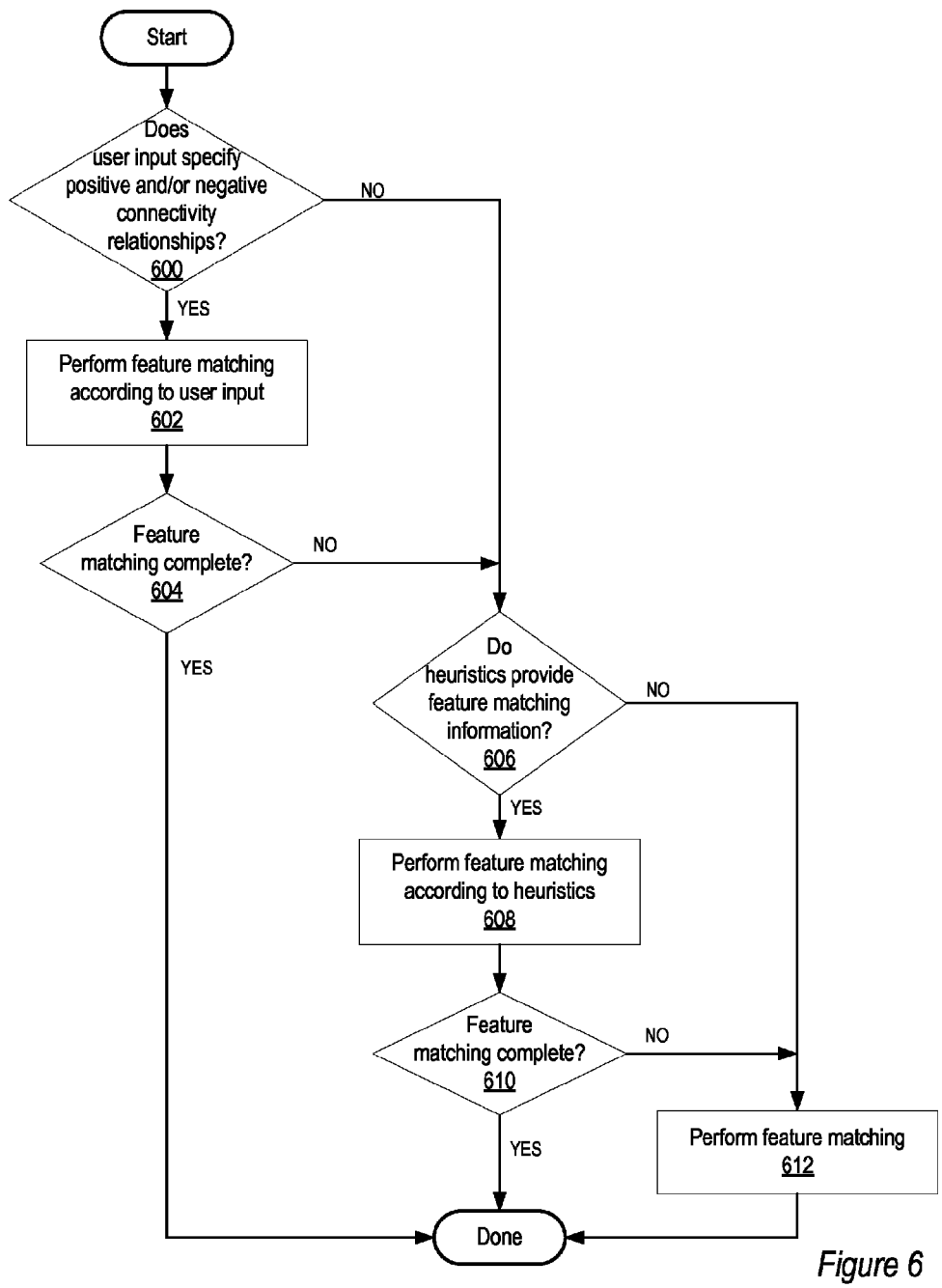
FIG. 6 illustrates the use of user input and heuristics in processing a set of component images in an exemplary image feature matching component, such as feature matching component 220 illustrated in FIGS. 1 through 5, according to one embodiment.

FIG. 6 illustrates the use of user input and heuristics in processing a set of component images in an exemplary image feature matching component, such as feature matching component 220 illustrated in FIGS. 1 through 5, according to one embodiment. In one embodiment, user input 120 may be specified and input to the feature matching process, for example as a markup language file. An exemplary markup language that may be used in one embodiment is XML. Other markup languages, other formats than markup languages, or other user input mechanisms may be used in various embodiments. An exemplary XML user input 120 is described above in reference to FIG. 1. In one embodiment, user input 120 may specify positive and/or negative connectivity relationships among the input set of component images to be processed by feature matching component 220. In other embodiments, user input 120 may also be used to specify other geometric information or other information about a set of component images 100, and/or about how the component images 100 of a composite image were captured.

As indicated at 600, if there is user input 120 specifying positive and/or negative relationships among the input set of component images to be processed by feature matching component 220, and possibly other information about the component images 100, feature matching component 220 may first attempt to perform feature matching in accordance with the information indicated in user input 120, as indicated at 602. User input 120 may, for example, be used to determine target component images 130 and component image subsets 400 to be used in feature matching 304.

At 600, if there is no user input 120, or if there is user input 120 but the user input 120 does not specify connectivity relationships such that the information in user input 120 can be used in the feature matching process, then feature matching component 220 may proceed to 606.

User input 120, if provided, may be, but is not necessarily, complete. That is, user input 120 may specify a complete set of connectivity relationships among the component images necessary to generate the feature correspondences 104 and determine the geometric relationships 106 to generate a composite image 110. If so, then, at 604, feature matching may have been completed using the user input 120. The geometric relationships 106 generated by the feature matching component 220 may then be passed to image stitching 208, which generates the composite image(s) 110. If user input 120 is not complete, then feature matching may not have been completed at 604, and feature matching component 220 may thus proceed to 606 to attempt to complete feature matching.

As indicated at 606, feature matching component 220 may attempt to use heuristics to provide feature matching information that may, for example, be used to determine target component images 130 and component image subsets 400 to be used in feature matching 304. Heuristics that may be used may include, but are not limited to, image file information about component images 100 and geometric relationships 106 generated by geometric relationship determination module 206. Image file information related to the component images 100 that may be used as heuristics may include, but is not limited to, file names, image sequence numbers, timestamps, or in general any file information related to component image files 100. If, at 606, feature matching component 220 determines that available heuristics provide information that may be used, for example, to select target component images 130 and/or to determine component image subsets 400 to which target component images 130 are to be compared, then feature matching component 220 may perform feature matching according to the available heuristics, as indicated at 608. In various embodiments, feature matching component 220 may attempt to use two or more different heuristics, or combinations of heuristics, at 606 and 608 to perform feature matching.

If, at 606, feature matching component 220 determines that available heuristics do not provide information that may be used in the feature matching process, or if, at 610, feature matching cannot be completed using the available heuristics, then feature matching component 220 may proceed to 612. If, at 610, feature matching has been completed, then the geometric relationships 106 generated by the feature matching component 220 may be passed to image stitching 208, which generates the composite image(s) 110.

At 612, feature matching component 220 may perform feature matching for a set of input composite images 100 if neither user input 120 nor heuristics can be used in the feature matching process, or may complete a partially completed feature matching for a set of input composite images if feature matching was partially performed but not completed at 602, at 604, or at 602 and 604. In one embodiment, at 612, feature matching component 220 may default to comparing every image, or every remaining unprocessed image, to every other component image in the set of component images. Alternatively, feature matching component 220 may use some other method to determine target component images 130 and component image subsets 400.

Exemplary System

Various components of embodiments, including but not limited to instances of a composite image generation system including an image feature matching component as described herein, may be executed on one or more computer systems, which may interact with various other devices. One such computer system is illustrated by FIG. 7. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for instances of the composite image generation system including an image feature matching component, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, configured to implement embodiments of the composite image generation system including an image feature matching component as described herein, and data storage 735, comprising various data accessible by program instructions 725. In one embodiment, program instructions 725 may include software elements of a composite image generation system 200 including an image feature matching component 220 as illustrated in FIGS. 1 through 5. Data storage 735 may include data that may be used in embodiments. In other embodiments, other or different software elements and data may be included.

Those skilled in the art will appreciate that computer system 700 is merely illustrative and is not intended to limit the scope of the composite image generation system including an image feature matching component as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    iteratively performing, by one or more computers:
        selecting a target image from a plurality of component images;

selecting, according to one or more heuristics for selecting subsets of component images, a component image subset from among one or more subsets of the plurality of component images, wherein each component image subset includes one or more of the plurality of component images, and wherein the target image is not in a subset;

comparing features of the target image to features of the component images in the one or more component image subsets starting at the selected component image subset until locating a component image subset that includes a component image that overlaps the target image according to respective features of the images or until all of the component image subsets have been searched;

if said comparing locates a component image subset that includes a component image that overlaps the target image, adding the target image to the component image subset; and if said comparing does not locate a component image subset that includes a component image that overlaps the target image, forming a new component image subset that includes the target image;

until all of the component images in the plurality of component images have been processed.

2. The method as recited in claim 1, wherein the one or more heuristics for selecting subsets of component images include one or more of file information about the component images or geometric relationship information about the component images.

3. The method as recited in claim 2, wherein the file information about the component images includes one or more of file names, image sequence numbers, or timestamps, and wherein the geometric relationship information includes one or more of information indicating overlapping images, information indicating non-overlapping images, or information describing a region of overlap between two images if the images overlap.

4. The method as recited in claim 1, wherein comparing features of the target image to features of a given one of the component images in the one or more component image subsets comprises:
determining a region of overlap between the target image and the component image; and
comparing features of the target image and the component image only within the region of overlap.

5. The method as recited in claim 1, further comprising, if said comparing locates a component image subset that includes a component image that overlaps the target image:
determining that the component image subset includes a component image that overlaps at least one component image in another component image subset; and
merging the component image subset and the other component image subset.

6. The method as recited in claim 1, further comprising, if said comparing locates a component image subset that includes a component image that overlaps the target image, generating feature correspondences for the target image and at least one component image in the component image subset.

7. The method as recited in claim 6, further comprising generating, from said feature correspondences, geometric relationship information about the component images in the component image subset.

8. The method as recited in claim 7, wherein the geometric relationship information includes one or more of information indicating overlapping images, information indicating non-overlapping images, or information describing a region of overlap between two images if the images overlap.

9. The method as recited in claim 1, wherein said selecting a target image from a plurality of component images comprises selecting the target image from the plurality of component images according to one or more heuristics for selecting a target image, wherein the heuristics for selecting a target image include file information about the component images.

10. The method as recited in claim 9, wherein the file information about the component images includes one or more of file names, image sequence numbers, or timestamps.

11. A system, comprising:
at least one processor; and
a memory comprising program instructions, wherein the program instructions are executable by the at least one processor to:
iteratively perform:
select a target image from a plurality of component images;
select, according to one or more heuristics for selecting subsets of component images, a component image subset from among one or more subsets of the plurality of component images, wherein each component image subset includes one or more of the plurality of component images, and wherein the target image is not in a subset;
compare features of the target image to features of the component images in the one or more component image subsets starting at the selected component image subset until locating a component image subset that includes a component image that overlaps the target image according to respective features of the images or until all of the component image subsets have been searched;
if said comparing locates a component image subset that includes a component image that overlaps the target image, add the target image to the component image subset; and
if said comparing does not locate a component image subset that includes a component image that overlaps the target image, form a new component image subset that includes the target image;
until all of the component images in the plurality of component images have been processed.

12. The system as recited in claim 11, wherein the one or more heuristics for selecting subsets of component images include one or more of file information about the component images or geometric relationship information about the component images.

13. The system as recited in claim 11, wherein, to compare features of the target image to features of a given one of the component images in the one or more component image subsets, the program instructions are executable by the at least one processor to:
determine a region of overlap between the target image and the component image; and
compare features of the target image and the component image only within the region of overlap.

14. The system as recited in claim 11, wherein the program instructions are executable by the at least one processor to, if said comparing locates a component image subset that includes a component image that overlaps the target image:
determine that the component image subset includes a component image that overlaps at least one component image in another component image subset; and
merge the component image subset and the other component image subset.

15. The system as recited in claim 11, wherein the program instructions are executable by the at least one processor to, if said comparing locates a component image subset that includes a component image that overlaps the target image, generate geometric relationship information about the component images in the component image subset, wherein the geometric relationship information includes one or more of information indicating overlapping images, information indicating non-overlapping images, or information describing a region of overlap between two images if the images overlap.

16. A non-transitory computer-readable storage medium comprising program instructions, wherein the program instructions are computer-executable to implement:
iteratively performing:
selecting a target image from a plurality of component images;
selecting, according to one or more heuristics for selecting subsets of component images, a component image subset from among one or more subsets of the plurality of component images, wherein each component image subset includes one or more of the plurality of component images, and wherein the target image is not in a subset;
comparing features of the target image to features of the component images in the one or more component image subsets starting at the selected component image subset until locating a component image subset that includes a component image that overlaps the target image according to respective features of the images or until all of the component image subsets have been searched;
if said comparing locates a component image subset that includes a component image that overlaps the target image, adding the target image to the component image subset; and
if said comparing does not locate a component image subset that includes a component image that overlaps the target image, forming a new component image subset that includes the target image;
until all of the component images in the plurality of component images have been processed.

17. The non-transitory computer-readable storage medium as recited in claim 16, wherein the one or more heuristics for selecting subsets of component images include one or more of file information about the component images or geometric relationship information about the component images.

18. The non-transitory computer-readable storage medium as recited in claim 16, wherein, in said comparing features of the target image to features of a given one of the component images in the one or more component image subsets, the program instructions are computer-executable to implement:
determining a region of overlap between the target image and the component image; and
comparing features of the target image and the component image only within the region of overlap.

19. The non-transitory computer-readable storage medium as recited in claim 16, wherein the program instructions are computer-executable to implement, if said comparing locates a component image subset that includes a component image that overlaps the target image:
determining that the component image subset includes a component image that overlaps at least one component image in another component image subset; and
merging the component image subset and the other component image subset.

20. The non-transitory computer-readable storage medium as recited in claim 16, wherein, in said selecting a target image from a plurality of component images, the program instructions are computer-executable to implement selecting the target image from the plurality of component images according to one or more heuristics for selecting a target image, wherein the heuristics for selecting a target image include one or more of file names, image sequence numbers, or timestamps for the component images.

* * * * *